(12) United States Patent
Gaither (10) Patent No.: US 11,697,348 B2
(45) Date of Patent: Jul. 11, 2023

(54) FARM-BASED PREDICTIVE EFFICIENT DRIVE

(71) Applicant: Toyota Motor Engineering & Manufacturing North America, Inc., Plano, TX (US)

(72) Inventor: Geoffrey D. Gaither, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 419 days.

(21) Appl. No.: 16/909,854

(22) Filed: Jun. 23, 2020

(65) Prior Publication Data
US 2021/0394622 A1 Dec. 23, 2021

(51) Int. Cl.
| | |
|---|---|
| B60L 15/20 | (2006.01) |
| B60L 7/18 | (2006.01) |
| B60Q 9/00 | (2006.01) |
| G01C 21/34 | (2006.01) |
| H02J 7/00 | (2006.01) |
| G01S 19/42 | (2010.01) |

(52) U.S. Cl.
CPC .......... B60L 15/2009 (2013.01); B60L 7/18 (2013.01); B60Q 9/00 (2013.01); G01C 21/3407 (2013.01); H02J 7/007 (2013.01); H02J 7/0068 (2013.01); B60L 2240/622 (2013.01); B60L 2250/00 (2013.01); G01S 19/42 (2013.01)

(58) Field of Classification Search
CPC ........ B60L 15/2009; B60L 7/18; B60Q 9/00; G01C 21/3407; H02J 7/0068; H02J 7/007

USPC .......................................................... 701/22
See application file for complete search history.

(56) References Cited

U.S. PATENT DOCUMENTS

| | | |
|---|---|---|
| 5,743,347 A | 4/1998 | Gingerich |
| 7,876,104 B2 | 1/2011 | Tarasinkski |
| 8,103,395 B2 | 1/2012 | Bissontz |
| 8,106,529 B2 | 1/2012 | Smith et al. |
| 10,032,117 B2 | 7/2018 | Hodel et al. |

(Continued)

FOREIGN PATENT DOCUMENTS

EP 2448108 A2 5/2012

OTHER PUBLICATIONS

ATZ Offhighway, Nov. 2016, Electrification and Driver Assist Technology in the ZF Innovation Tractor by Gotz et al.

(Continued)

*Primary Examiner* — Peter D Nolan
*Assistant Examiner* — Luke Huynh
(74) *Attorney, Agent, or Firm* — Snell & Wilmer LLP (57) ABSTRACT

Methods, systems, devices and apparatuses for a vehicle control system. The vehicle control system includes a memory. The memory is configured to store multiple charging events that activate multiple charging plans. The vehicle control system includes a navigation unit that is configured to obtain a current location of the vehicle. The vehicle control system includes an electronic control unit. The electronic control unit is configured to determine that the vehicle is within a threshold distance of the first charging event. The electronic control unit is configured to control an operation of the vehicle to prepare the vehicle to charge or discharge the battery based on a first charging plan when the vehicle is within the threshold distance of a first charging event.

17 Claims, 5 Drawing Sheets

(56) References Cited

U.S. PATENT DOCUMENTS

| | | |
|---|---|---|
| 10,183,563 B2 | 1/2019 | Rayner et al. |
| 10,518,831 B2 | 12/2019 | Wright |
| 2018/0116102 A1 | 5/2018 | Taylor et al. |
| 2018/0236994 A1 | 8/2018 | Healy et al. |
| 2019/0111924 A1* | 4/2019 | Rajendran ............ B60W 30/18 |
| 2019/0200510 A1 | 7/2019 | Chrysanthakopoulos et al. |
| 2019/0291779 A1 | 9/2019 | Zeiler et al. |
| 2019/0383637 A1* | 12/2019 | Teske ..................... B60L 53/65 |
| 2021/0339647 A1* | 11/2021 | Batir ..................... B60L 53/68 |

OTHER PUBLICATIONS

IEEE 2019, Numerical Methods for Optimal Control of Hybrid Electric Agricultural Tractors by Jia et al.
Int. J. Agric & Biol Eng. Jan. 2019, Powertrain parameter matching and optimal design of dual-motor driven electric tractor by Chen et al.

* cited by examiner

FARM-BASED PREDICTIVE EFFICIENT DRIVE

BACKGROUND

Field

This disclosure relates to a system, method, apparatus and/or device for managing charging and discharging of a fuel cell or a battery of an agricultural or other off-highway vehicle.

Description of the Related Art

Various powertrains exist for a wide variety of applications from passenger vehicles to class 8 trucks. These powertrains, however, are designed mainly for operation of vehicles along roadways and other conventionally driven roads. These powertrains may include hybrid powertrains, all-electric powertrains and/or other zero-emission powertrains. Even though hybrid vehicles, electrical vehicles (EV) and other zero-emission vehicles (ZEV) are prevalent on conventional roadways, there is little penetration of EV or ZEV in the off-highway vehicle industry. For example, when the hybrid, electric or other zero-emission vehicle travels off-highway little consideration is given to optimizing the energy usage and storage of the electrical energy in the battery or the fuel cell.

Accordingly, there is a need for a system, apparatus and/or method to improve the real-world efficiency of the off-highway vehicle using predictive efficient drive concepts.

SUMMARY

In general, one aspect of the subject matter described in this disclosure may be embodied in a vehicle control system. The vehicle control system includes a memory. The memory is configured to store multiple charging events that activate multiple charging plans. The multiple charging events include a first charging event that activates a first charging plan. The vehicle control system includes a navigation unit. The navigation unit is configured to obtain a current location of the vehicle. The vehicle control system includes an electronic control unit. The electronic control unit is coupled to the navigation unit. The electronic control unit is configured to determine that the vehicle is within a threshold distance of the first charging event. The electronic control unit is configured to control an operation of the vehicle to prepare the vehicle to charge or discharge the battery based on the first charging plan when the vehicle is within the threshold distance of the first charging event.

These and other embodiments may optionally include one or more of the following features. The multiple charging events may include a second charging event that activates a second charging plan and a third charging event that activates a third charging plan. The first charging event may be a stopping event. The first charging plan may be a short-term charging plan. The second charging event may be an uphill event or a downhill event. The second charging plan may be a medium-term charging plan. The third charging event may be a home event. The third charging plan may be a long-term charging plan.

The electronic control unit may be configured to determine a regenerative braking location based on a location of the stopping event. The electronic control unit may be a coasting location based on the regenerative braking location. The electronic control unit may be configured to indicate to a driver to release an accelerator pedal of the vehicle at the coasting location to capture energy while coasting.

The electronic control unit may be configured to determine an amount of regenerative energy capacity. The electronic control unit may be configured to determine the regenerative braking location further based on the amount of regenerative energy capacity. The electronic control unit may be configured to determine a coasting deceleration drive rate that affects deceleration of the vehicle while coasting. The electronic control unit may be configured to determine the coasting location further based on the coasting deceleration drive rate.

The first charging event may be an uphill event or a downhill event. The electronic control unit may be configured to discharge a battery to move the vehicle when the vehicle is within the threshold distance of the downhill event. The electronic control unit may be configured to charge the battery when the vehicle is within the threshold distance of the uphill event. The first charging event may be a home event. The electronic control unit may be configured to determine a profile to be implemented during a next trip. The electronic control unit may be configured to charge or discharge a battery of the vehicle based on the profile to be implemented during the next trip. The electronic control unit may be configured to charge the battery of the vehicle while the vehicle is traveling to a location of the home event when the profile indicates that a trailer is to be attached during the next trip.

In another aspect, the subject matter may be embodied in a vehicle control system. The vehicle control system includes a navigation unit. The navigation unit is configured to obtain a current location of the vehicle and multiple charging events. The vehicle control system includes an electronic control unit. The electronic control unit is coupled to the navigation unit and configured to determine that the vehicle is within a threshold distance of a charging event. The electronic control unit is configured to determine whether the charging event is associated with a short-term charging plan, a medium-term charging plan or a long-term charging plan. The electronic control unit is configured to control an operation of the vehicle to prepare the vehicle to charge or discharge a battery based on the first charging plan, the second charging plan or the third charging plan when the vehicle is within the threshold distance of the charging event.

In another aspect, the subject matter may be embodied in an method of charging a vehicle. The method includes obtaining or determining, by a processor, multiple locations of charging events including a first location of a first charging event. The first charging event being associated with a first charging plan. The method includes obtaining, by the processor, a current location of the vehicle. The method includes determining, by the processor, that the vehicle is within a threshold distance of the first charging event based on the current location of the vehicle and the first location of the first charging event. The method includes controlling, by the processor, an operation of the vehicle to prepare the vehicle to charge or discharge a battery based on the first charging plan when the vehicle is within the threshold distance of the first location of the first charging event.

BRIEF DESCRIPTION OF THE DRAWINGS

Other systems, methods, features, and advantages of the present invention will be apparent to one skilled in the art upon examination of the following figures and detailed description. Component parts shown in the drawings are not

DETAILED DESCRIPTION

Disclosed herein are systems, apparatuses, and methods for a vehicle control system that manages the charging and discharging of the fuel cell and/or battery of the vehicle to store energy within the battery and/or propel the vehicle. An off-highway vehicle may use the vehicle control system to optimize energy usage, storage and generation while traveling off-highway. The vehicle control system uses and employs predictive efficient drive concepts to improve real-world efficiency. The predictive efficient drive concepts may predict short-term changes in energy-usage, such as when a vehicle plans to stop, and accordingly, indicate to the driver of the vehicle when to begin coasting and when to begin braking to recapture the maximum amount of energy from coasting and from regenerative braking in off-highway applications. Thus, this invention increases the amount of energy generated and recaptured from coasting and regenerative braking and improves fuel efficiency.

Other benefits and advantages of the predictive efficient concepts include the capability to determine medium-term changes in energy usage, such as changes in a route including the grade, speed or power used by the vehicle along the route, and long-term changes in energy usage, such as an energy profile related to different uses of the vehicle that require different attached equipment and/or operating areas.

Figure 1:
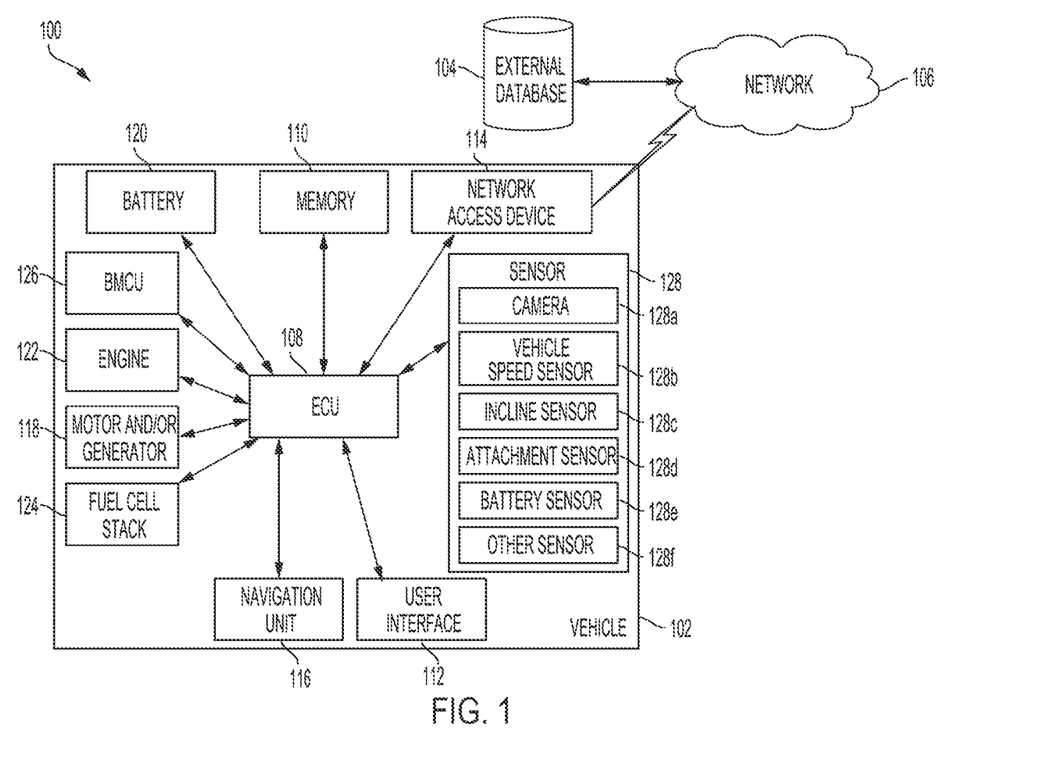
FIG. 1 is a block diagram of a vehicle control system according to an aspect of the invention.

FIG. 1 is a block diagram of a vehicle control system 100. The vehicle control system 100 or a portion thereof may be retro-fitted, coupled to, include or be included within a vehicle 102 or completely separate from the vehicle 102. The vehicle control system 100 may include or be coupled to an external database 104 via a network 106.

The vehicle control system 100 may have or use a network 106 to communicate among different components, such as between the vehicle 102 and the external database 104. The network 106 may be a Dedicated Short-Range Communication (DSRC) network, a local area network (LAN), a wide area network (WAN), a cellular network, the Internet, or combination thereof, that connects, couples and/or otherwise communicates among the different components of the vehicle control system 100.

The vehicle control system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may include a map database. The map database may store map information that includes one or more charging events. The map information may be provided to the user interface 112 so that a user can visualize the surrounding environment and/or be used to control the operation of the battery 120, the engine 122 and/or the fuel cell stack 124 to traverse the route efficiently.

The one or more charging events include various types or kinds of charging events. For example, the one or more charging events may include a stopping event, a turning event, a terrain event, and/or a home event. The one or more charging events are locations where the vehicle 102 may need to execute the charging or discharging of the battery 120 and/or the fuel cell stack 124 to optimize the energy efficiency of the vehicle 102. Correspondingly, the vehicle control system 100 may control the engine 122 to power the wheels of the vehicle 102 and to charge the battery 120 and/or the fuel cell stack 124 when required. The one or more charging events may be located near an object, structure or terrain feature that provides an opportunity for the vehicle 102 to optimize management of the charging and/or discharging of the battery 120 and/or the fuel cell stack 124.

A stopping event may be a place where the vehicle 102 may have to stop, e.g., a location where the vehicle 102 stops along a hay ride or a tourist stop where the vehicle 102 stops to allow customers to view the surroundings, a refueling or a charging station, a barn, a silo or maintenance shed, or other structure or place where the vehicle 102 may need to stop. Other stopping events may include a location at the end of a road or at the bottom of a hill. A turning event may be a place where the vehicle 102 may have to turn, e.g., turning along a route to plow or harvest a different row of crops, which may require the vehicle 102 to slow down. A terrain event may be a terrain feature, such as a hill, a marsh, a dirt patch or other terrain feature along the route that may cause the vehicle 102 to slow down or speed up due to the terrain feature, which may cause the vehicle 102 to discharge or charge the battery 120 or fuel cell stack 124 more than when the vehicle 102 is traversing along an unimpeded portion of the route. The terrain features may include the topography of the property, which may indicate hills, trees, slopes, marshes, wetlands, the inclination of the route that is being traversed and/or other information that relates to the terrain of the property. A home event may be a barn, a garage or other structure where the vehicle 102 returns to after traveling the route to be stored until an operator desires to operate the vehicle 102.

The vehicle control system 100 may include, be included within or be retro-fitted to a vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. The vehicle 102 may be an off-road or an off-highway vehicle that is used for agricultural or other off-highway application. The vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The vehicle control system 100 includes one or more processors, such as the electronic control unit (ECU) 108. The one or more processors, such as the ECU 108 may be implemented as a single processor or as multiple processors. For example, the one or more processors may be a microprocessor, a data processor, a microcontroller or other controller, and may be electrically coupled to some or all the other components within the vehicle 102 and/or the external database 104. The one or more processors may obtain sensor data and/or the current location of the vehicle 102, determine the route that the vehicle 102 is traversing, determining one or more charging events while traveling the traversed route, and/or control and/or manage the charging and/or discharging of the battery 120 and/or the fuel cell stack 124 to propel or move the vehicle 102. The ECU 108 may be coupled to the memory 110.

The memory 110 may be coupled to the ECU 108 and store instructions that the ECU 108 executes. The memory 110 may include one or more of a Random Access Memory (RAM), a Read Only Memory (ROM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108. The memory 110 may store user configuration settings that establish the parameters of various types of vehicles, various route patterns for various seasons, one or more charging events and/or one or more routes on one or more properties.

The vehicle control system 100 may include may a user interface 112. The user interface 112 may be part of the vehicle 102 and may include an input device that receives user input from a user interface element, a button, a dial, a microphone, a keyboard, or a touch screen. The user interface 112 may include a display or other interface for a user to provide user input to indicate locations of stopping events, home events, terrain events or one or more other charging events. Moreover, the user interface 112 may provide an output device, such as a display, a speaker, an audio and/or visual indicator, or a refreshable braille display. The user interface 112 may provide the output device, such as a display, any notifications, warnings or alerts and/or a map of the property to show the one or more charging events to the user.

The vehicle control system 100 includes a network access device 114. The network access device 114 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 114 may transmit data to and receive data from the different components of the different components of the vehicle control system 100, such as the vehicle 102 and/or the external database 104.

The vehicle control system 100 may include a navigation unit 116. The navigation unit 116 may be integral to the vehicle 102 or a separate unit that is coupled to the vehicle 102. The vehicle 102 may include a Global Positioning System (GPS) unit (not shown) for detecting location data including a current location of the vehicle 102 and date/time information instead of the navigation unit 116. The current location of the vehicle 102 and/or the date/time information may be used to indicate when the vehicle 102 is within the boundaries of the property, where the vehicle 102 is along a route, and/or may be used to calculate the speed of the vehicle 102. The current location may also be used to determine the route of the vehicle 102 and/or determine where the vehicle 102 is along the route that is being traversed. In some implementations, the ECU 108 may perform the functions of the navigation unit 116 based on data received from the GPS unit. The navigation unit 116 or the ECU 108 may perform navigation functions. Navigation functions may include, for example, route and route set prediction, providing navigation instructions, and receiving user input such as verification of predicted routes and route sets or destinations. The navigation unit 116 may be used to obtain navigational map information. The navigational map information may include the current location of the vehicle 102 and/or map information that includes the locations of one or more charging events, such as one or more objects, structures, terrain features or other charging events.

The vehicle control system 100 may include or be coupled to one or more vehicle components. The one or more vehicle components may include a motor and/or generator 118. The motor and/or generator 118 may convert electrical energy into mechanical power, such as torque, and may convert mechanical power into electrical energy. The motor and/or generator 118 may be coupled to the battery 120. The motor and/or generator 118 may convert the energy from the battery 120 into mechanical power, and may provide energy back to the battery 120, for example, via regenerative braking or via coasting. The vehicle 102 may include one or more additional power generation devices such as the engine 122 or a fuel cell stack 124. The engine 122 combusts fuel to provide power instead of and/or in addition to the power supplied by the motor and/or generator 118. The fuel cell stack 124 may be composed of multiple fuel cells. The fuel cell stack 124 may convert an energy source, such as hydrogen gas and oxygen, into electrical power, which may power the motor and/or generator 118.

The battery 120 may be coupled to the motor and/or generator 118 and may supply electrical energy to and receive electrical energy from the motor and/or generator 118. The battery 120 may include one or more rechargeable batteries and may supply the power to the vehicle control system 100.

A battery management control unit (BMCU) 126 may be coupled to the battery 120 and may control and manage the charging and discharging of the battery 120. The BMCU 126, for example, may measure, using battery sensors, parameters used to determine the state of charge (SOC) of the battery 120. The BMCU 126 may control the battery 120.

The vehicle control system 100 may include one or more sensors 128. The one or more sensors 128 may include a camera 128a, a vehicle speed sensor 128b, an incline sensor 128c, an attachment sensor 128d, a battery sensor 128e or other sensor 128f. The camera 128a may be used to capture image data. The ECU 108 may analyze the image data to recognize objects or structures, such as barn, a maintenance shed or other structure where the vehicle 102 may stop. The one or more sensors 128 may include a vehicle speed sensor 128b. The vehicle speed sensor 128b may measure a speed of the vehicle 102. The speed of the vehicle 102 may be used to determine the locations of one or more charging events, such as a stopping event, and/or one or more other locations to identify to the driver when to coast to recapture electrical energy. For example, when the vehicle 102 stops, such as when the speed of the vehicle 102 is approximately 0 mph, the vehicle control system 100 may identify the location as a location of a stopping event.

The one or more sensors may include an incline sensor 128c, such as an inclinometer. The grade or the level of the incline may be used to determine the locations of one or more charging events, such as a hill event, where the driver may need to discharge more energy to travel uphill and/or may have an opportunity to capture more energy when travelling downhill. The incline sensor 128c may identify a grade or a level of an incline along a portion of the route of the vehicle 102. If the grade or the level of the incline is increasing, this may indicate that the vehicle 102 is traveling uphill, which may indicate an upslope of a hill, whereas if the grade or the level of the incline is decreasing, this may indicate that the vehicle 102 is traveling downhill, which may indicate a downslope of the hill.

The one or more sensors 128 may include an attachment sensor 128d. The attachment sensor 128d may be used to identify whether an attachment device, such as a trailer, is coupled to the vehicle 102. When an attachment device is coupled to the vehicle 102, the vehicle configuration may be stored and associated with an energy profile for the vehicle 102. Since the attachment device adds weight to the vehicle configuration, the energy usage of the vehicle 102 will be different when the attachment device is coupled to the vehicle 102. And thus, the vehicle control system 100 may adopt a different energy plan for the route based on whether the attachment device is coupled to the vehicle 102.

The one or more sensors 128 may include a battery sensor 128e or other sensors 128f. The battery sensor 128e may measure a state of charge of the battery 120 or the fuel cell stack 124. The ECU 108 may determine the amount of energy that may be recaptured based on the state of charge of the battery 120 or the fuel cell stack 124 that remains stored. The battery sensor 128e may measure or detect an amount of energy discharged to power the vehicle 102 or recaptured from coasting and/or from regenerative braking. The other sensors 128f may include a proximity sensor, LIDAR, radar, infrared, or other signal to detect one or more objects or detect other attributes or characteristics of the surrounding environment.

Figure 2:
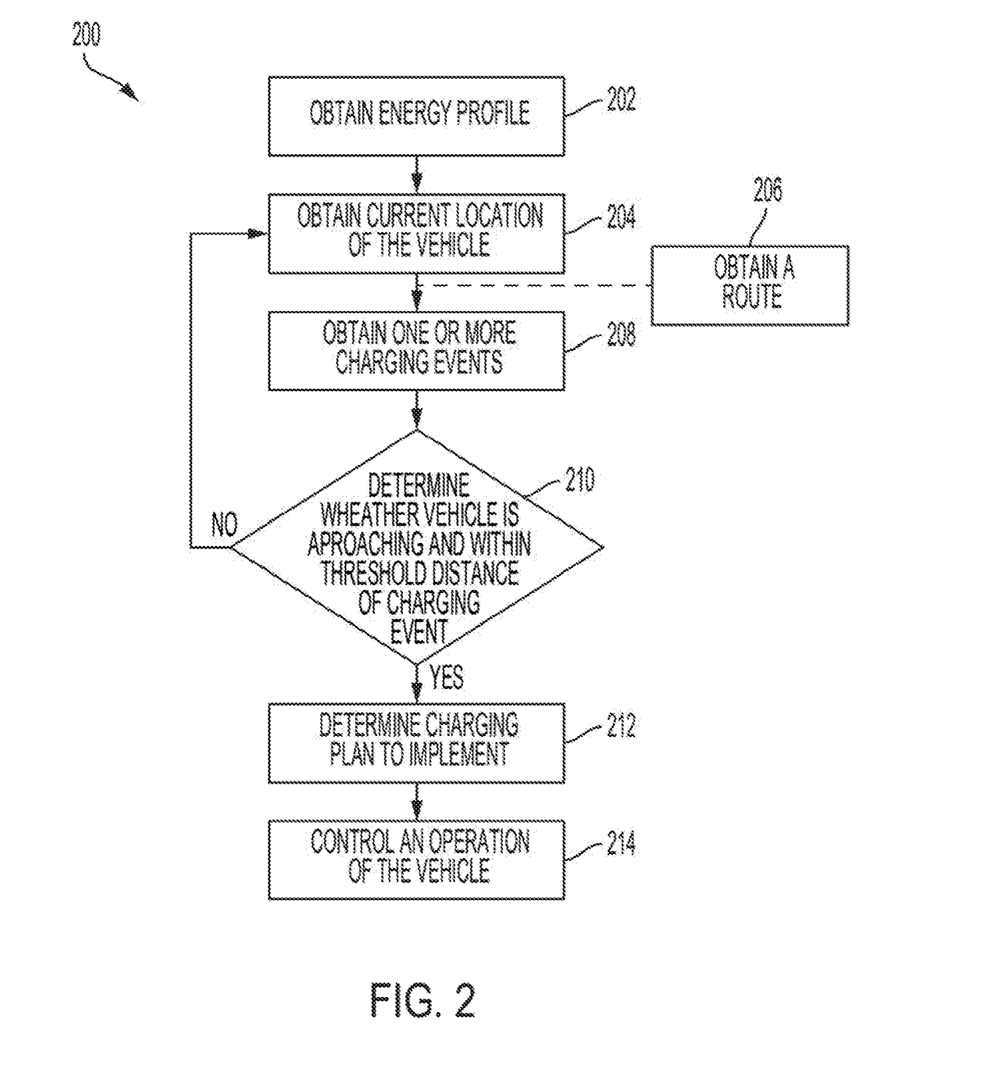
FIG. 2 is a flow diagram of an example process for controlling the operation of the vehicle using the vehicle control system of FIG. 1 according to an aspect of the invention.

FIG. 2 is a flow diagram of a process 200 for more efficiently operating or controlling the operation of the vehicle 102. One or more computers or one or more data processing apparatuses, for example, the ECU 108 of the vehicle control system 100 of FIG. 1, appropriately programmed, may implement the process 200. The vehicle control system 100 may execute a charging plan that corresponds to a charging event when the vehicle 102 is at or within a threshold distance of the location of the charging event on the route of the vehicle 102.

Figure 4:
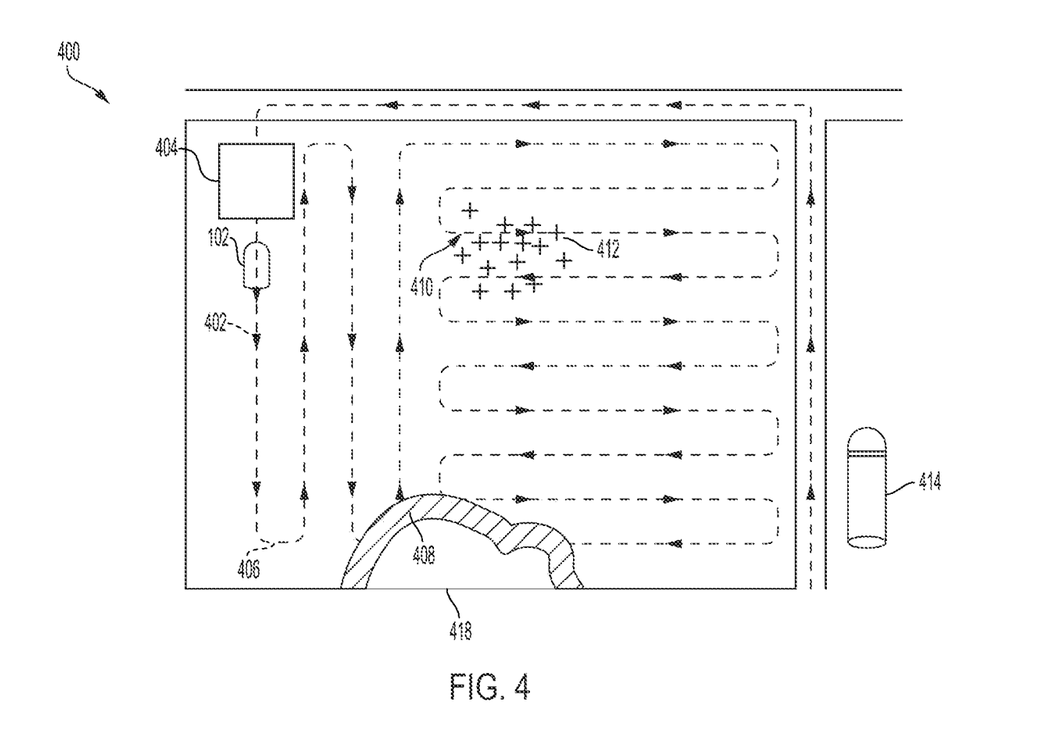
FIG. 4 shows an example graphical representation of the property using the vehicle control system of FIG. 1 according to an aspect of the invention.

The vehicle control system 100 may obtain an energy profile (202). The energy profile may indicate one or more charging events on the property, such as the home event 404, the turn event 406, the marsh event 408 near the pond 418 and/or the uphill event 410 and the downhill event 412, as shown in FIG. 4 for example. The energy profile may include a charging plan, such as a short-term charging plan, a medium-term charging plan and/or a long-term charging plan, associated with each of the one or more charging events. The energy profile may be obtained from the memory 110 and may have been previously stored as learned data from a previous traversal by the vehicle 102 along the property. The energy profile may have been selected based on user input via the user interface 112 and/or been selected based on a schedule and/or the current time/date.

The vehicle control system 100 obtains the current location of the vehicle 102 (204). The vehicle control system 100 may use the navigation unit 116 to obtain navigational map information that includes the current location of the vehicle 102. The current location of the vehicle 102 may be extracted from the navigational map information. The vehicle control system 100 may use the current location of the vehicle 102 to determine the relative distance and/or direction of the vehicle 102 from one or more charging events. The current location may also be determined at different points in time to determine a speed and/or direction of the vehicle 102.

The control system 100 may obtain a route, such as the route 402 as shown in FIG. 4 for example, that the vehicle 102 is to travel or traverse (206). The control system 100 may receive user input that indicates a start location, which may be the current location of the vehicle 102, a destination location and various waypoints in between to indicate a path that the vehicle 102 travels from the start location to the destination location. In some implementations, the route 402 may be pre-programmed, pre-set or be extracted from the energy profile that was obtained. The vehicle control system 100 may receive user input that indicates a season or a crop or other indicator that may be associated with the route to be traveled. And, subsequently, the control system may obtain the route that is associated with the season, the crop or the other indicator indicated in the user input from the memory 110 or from the external database 104.

The vehicle control system 100 obtains one or more charging events (208). The vehicle control system 100 may extract the one or more charging events from the map information included within the navigational map information that is obtained using the navigation unit 116 and/or from the energy profile. The map information may include an identifier that indicates the type or kind of charging event for each of the one or more charging events. For example, the identifier may indicate that the charging event is a stopping event 414, a turning event 406, a road condition event, such as an uphill event 410 or a downhill event 412, a home event 404 or other type or kind of event. The map information may also include the location of each of the one or more charging events.

In some implementations, the one or more charging events may have been previously stored in the memory 110, and subsequently, the vehicle control system 100 may obtain the one or more charging events from the memory 110. For example, during one or more previous trips traversing the route or property, the vehicle control system 100 may record when the vehicle 102 stops, and the vehicle control system 100 records the location that the vehicle 102 stops as a stopping event 414. Similarly, in another example, during the one or more previous trips, the vehicle control system 100 may record when the vehicle 102 turns, travels uphill, travels downhill, or has a prolonged stop and record those events as a turning event 406, an uphill event 410, a downhill event 412 or a home event 404, respectively. Thus, the vehicle control system 100 may learn the locations of the one or more charging events from one or more previous trips.

In some implementations, the vehicle control system 100 may provide the current location of the vehicle 102 or the route of the vehicle 102 to the external database 104, which may provide or supply map information of the area in proximity to the current location of the vehicle 102 or along the route of the vehicle 102. The map information may include the one or more charging events within a threshold distance of the current location of the vehicle 102 or along the route of the vehicle 102, such as within a threshold distance of the route. In some implementations, the one or more charging events may be detected in real-time based on sensor data from the one or more sensors 128.

The vehicle control system 100 determines whether the vehicle 102 is approaching and within a threshold distance of the one or more charging events (210). As discussed above, the vehicle control system 100 may use the current location of the vehicle 102, detected or measured over a period of time, to determine the direction that the vehicle 102. The vehicle control system 100 may compare the current location of the vehicle 102 with the locations of the one or more charging events and calculate a relative distance between the current location of the vehicle 102 and the one or more charging events. When the relative distance between the current location of the vehicle 102 is decreasing, this may indicate that the vehicle 102 is approaching the one or more charging events. And when the relative distance is less than the threshold distance, which may be approximately 50 feet-100 feet, the vehicle control system 100 determines and implements a charging plan associated with the charging event that the vehicle is at or near, such as within the threshold distance. Otherwise, when the vehicle 102 is not approaching or not within the threshold distance of the charging event, the vehicle control system 100 continues to monitor the location of the vehicle 102 relative to the locations of the one or more charging events.

Figure 3:
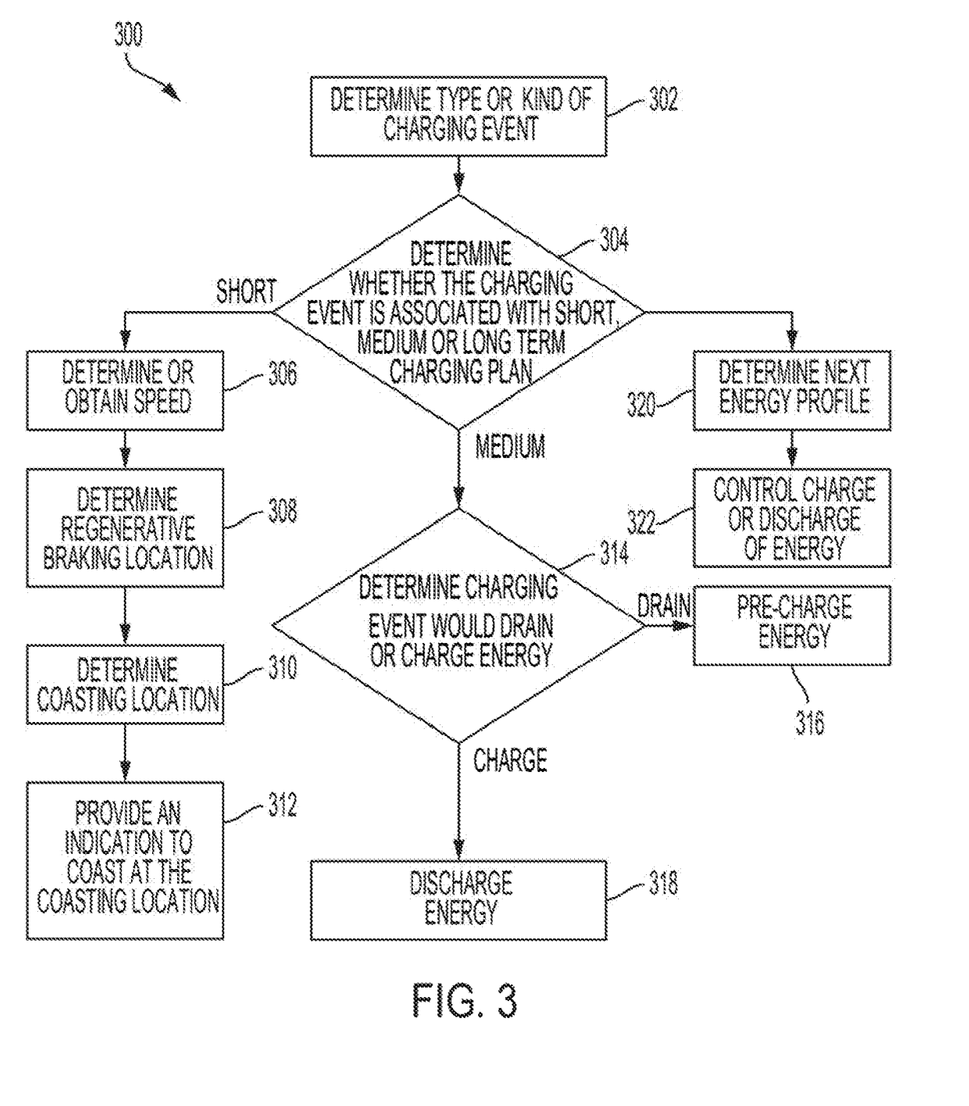
FIG. 3 is a flow diagram of an example process for implementing a short-term, a medium-term or a long-term charging planning using the vehicle control system of FIG. 1 according to an aspect of the invention.

Once the vehicle control system 100 determines that the vehicle is approaching and within the threshold distance of one or more charging events, the vehicle control system 100 determines the charging plan to implement for the charging event that is approaching and within the threshold distance (212). Each charging event may be associated with a charging plan, such as a short-term charging plan, a medium-term charging plan and/or a long-term charging plan. The charging plan creates an energy usage and/or storage profile for that charging event. The energy usage and/or profile may indicate that to operate the vehicle 102 most energy efficiently, the vehicle control system 100 may act or operate the vehicle 102 to pre-charge the battery 120 or the fuel cell stack 124 of the vehicle 102 prior to the charging event, or further discharge the battery 120 or the fuel cell stack 124 so that the vehicle control system 100 may recapture more energy during the charging event. Correspondingly, the vehicle control system 100 may need to utilize the engine 122 to power the wheels of the vehicle 102 when the vehicle control system 100 is pre-charging the battery 120 and/or the fuel cell stack 124. FIG. 3 further describes the process for determining and implementing the charging plan before, during and after the charging event.

After the charging plan is determined, the vehicle control system 100 controls an operation of the vehicle 102 based on the charging plan (214). The vehicle control system 100 may perform operations to improve the energy or fuel efficiency of the vehicle 102 at or near, such as within a threshold distance, of the location of the corresponding charging event associated with the charging plan. For example, when the vehicle control system 100 implements a short-term charging plan, the vehicle control system 100 may identify a coasting location where if the vehicle 102 were to begin coasting would recapture the maximum amount of energy from coasting and/or a regenerative braking location where if the vehicle 102 were to begin braking would recapture the maximum amount of energy from regenerative braking while slowing or stopping the vehicle at the braking event or the turning event. In another example, when the vehicle control system 100 implements a medium-term charging plan, the vehicle control system 100 may identify locations of charging events where the vehicle 102 requires additional power, such as at the bottom of a hill, to traverse and pre-charge the vehicle 102 so that the vehicle 102 has the additional power before reaching the location. Other examples of operations that the vehicle control system 100 may control include the discharging of power prior to a location of a charging event where the vehicle 102 may recapture a significant amount of electrical energy, such as at the top of the hill. FIG. 3 further describes the control of different operations of the vehicle 102 based on the different charging plans.

FIG. 3 is a flow diagram of a process 300 for implementing the charging plan associated with the charging event that is approaching and within the threshold distance. One or more computers or one or more data processing apparatuses, for example, the ECU 108 of the vehicle control system 100 of FIG. 1, appropriately programmed, may implement the process 300. The vehicle control system 100 implements the charging plan when the vehicle 102 is within the threshold distance of the charging event.

When the vehicle 102 is approaching a charging event and is within the threshold distance of the charging event, the vehicle control system 100 determines the type or kind of the charging event (302). The vehicle control system 100 may determine the type or kind of the charging event based on an identifier associated with the charging event that the vehicle 102 is approaching and within the threshold distance. For example, the identifier may identify that the charging event is a stopping event 414, a turning event 406, a home event 404, a road condition event, such as a downhill event 412, an uphill event 410, and/or other event, such as a marsh event 408. The identifier may be used to determine the charging plan to implement. The indicator may be part of the map information obtained with each of the one or more charging events or may be labeled via user input or learned from a previous traversal of the route.

In some implementations, the vehicle control system 100 may use real-time sensor data to detect or determine the type or kind of the charging event. For example, the vehicle speed sensor 128b may detect that the vehicle 102 is slowing, which may indicate a stopping event 414 or a turning event 406. In another example, an incline sensor 128c may indicate whether the vehicle 102 is traversing uphill or downhill, which may indicate an uphill event 410 or a downhill event 412, respectively.

Once the type or kind of the charging event is determined, the vehicle control system 100 determines whether the charging event is associated with a short-term, medium-term or long-term charging plan (304). Each of the different charging plans identifies operations of the vehicle 102 to implement as the vehicle 102 approaches the charging event. The operations may include when to use the engine 122 and/or pre-charge, charge and/or discharge the battery 120 and/or the fuel cell stack 124. This assists in optimizing the energy efficiency of the vehicle 102 and maximizes fuel and/or energy efficiency.

The vehicle control system 100 may determine whether the charging event is associated with the short-term, medium-term or long-term charging plan based on the type or kind of the charging event. For example, when the type or kind of the charging event is a turning event 406 or a stopping event 414, the vehicle control system 100 determines that the charging event is associated with a short-term charging plan. In another example, when the type or kind of the charging event is a road condition event, such as an uphill event, a downhill event or other road condition event, such as at a marsh, a muddy area or a wetland, the vehicle control system 100 determines that the charging event is associated with a medium-term charging plan. In some examples, a charging event may be associated with multiple charging plans. For example, a home event 404 may be associated with both the short-term charging plan and the long-term charging plan because the vehicle 102 will most likely stop at the location of the home event 404, which would implement the short-term charging plan, but since the vehicle 102 stops at the location for a long period of time, the long-term charging plan may also be implemented.

Once the charging plan is determined, the vehicle control system 100 implements different operations based on the charging plan to optimize the energy efficiency of the vehicle 102. When the vehicle control system 100 determines that the short-term charging plan is to be implemented, the vehicle control system 100 may determine or obtain the speed and/or weight of the vehicle 102 (306). The vehicle control system 100 may use one or more sensors 128, such as the vehicle speed sensor 128b, to measure or determine the speed of the vehicle 102. The vehicle control system 100 may use one or more other sensors to measure the weight of the vehicle 102. The speed and/or the weight may be used to calculate when to brake and/or when to coast to recapture the most energy via regenerative braking and/or to minimize energy usage while traveling. The weight of the vehicle 102 may include the weight of the vehicle 102 and/or the vehicle 102 and any attachment, such as a trailer.

The vehicle control system 100 may determine the regenerative braking location (308). The vehicle control system 100 determines the regenerative braking location based on the location of the charging event, and in particular, the location of the stopping event 414 or the location of the turning event 406, the weight of the vehicle 102, and/or the speed of the vehicle 102. The regenerative braking location is the location where the brake pedal should be depressed to maximize the amount of energy recaptured via regenerative braking to fill or charge the regenerative energy capacity of the vehicle 102 while also stopping the vehicle 102 at the location of the stopping event 414 or slowing the vehicle sufficiently, such as to a threshold amount of approximately 1 mph, to complete the turn at the location of the turning event 406. Moreover, when the vehicle 102 is traveling at a higher speed or a greater weight, the distance between the regenerative braking location and the location of the stopping event 414 or the location of the turning event 406 may need to be greater. This allows for the vehicle 102 to reach a complete stop at the location of the stopping event 414 or sufficiently slow the vehicle 102 to turn at the location of the turning event 406.

The regenerative braking location may also be based on the regenerative energy capacity of the vehicle 102. The regenerative energy capacity of the vehicle 102 may be limited to the amount of charge that may be stored and the current state of charge within the battery 120 and/or the fuel cell stack 124. For example, when the battery 120 is fully charged, no additional regenerative energy may be used to charge the battery 120, or when the battery 120 is only partially charged, the additional regenerative energy may only charge the battery 120 enough to fill the battery 120. And thus, since the vehicle 102 is partially or completely charged prior to initiating regenerative braking, the vehicle control system 100 may adjust the location of the regenerative braking location such that the driver does not unnecessarily coast or brake to maximize recapture of energy via regenerative braking. Moreover, the regenerative energy capacity is affected by the momentum of the vehicle 102, and as such, may be dependent on the weight and speed of the vehicle 102 including the weight of any attachments to the vehicle 102. As the vehicle 102 increases in weight and/or speed, the amount of energy that may be recaptured increases, and as the vehicle 102 decreases in weight and/or speed, the amount of energy that may be recaptured decreases.

The vehicle control system 100 may determine a coasting location (310). The coasting location is the location where the brake pedal and the accelerator pedal should be released so that vehicle 102 begins to coast and decelerates to a target speed at the regenerative braking location. When the vehicle 102 coasts, the vehicle 102 traverses the portion of the route more efficiently by conserving energy while also continuing along the portion of the route.

The vehicle control system 100 may determine the coasting location based on the regenerative braking location, the weight and/or speed of the vehicle 102 and/or a deceleration drive force. The vehicle control system 100 may calculate the distance needed for the vehicle 102 to decelerate to a target speed at the regenerative braking location using the deceleration drive force. The distance may be farther when the current speed of the vehicle 102 and/or the weight of the vehicle 102 is greater. The target speed allows the driver to brake at the regenerative braking location, maximize the amount of energy recaptured via regenerative braking, and stop the vehicle 102 at the location of the stopping event or slow the vehicle sufficiently to complete the turn at the location of the turning event.

Once the vehicle control system 100 determines the coasting location and/or the regenerative braking location, the vehicle control system 100 may provide an indication to coast to the driver (312). The vehicle control system 100 may provide the indication to coast when the vehicle 102 is at the coasting location. The vehicle control system 100 may display the indication on the user interface 112. The indication to coast may indicate to the driver to release the brake pedal and/or the accelerator pedal to allow the vehicle 102 to begin to coast when the vehicle 102 is at the coasting location. The vehicle control system 100 may or may not provide any indication about use of the brake pedal to comply with any number of circumstances, such as a government regulation.

This allows the vehicle control system 100 to capture the maximum amount of regenerative energy when the driver releases the brake pedal and/or the accelerator pedal at the coasting location and begins to brake and recapture energy when the vehicle 102 is at the regenerative braking location. Moreover, this expands the regenerative braking energy capture while the vehicle 102 is coasting and as a function of the state of charge of the battery and projected energy requirements.

When the vehicle control system 100 determines that the medium-term charging plan is to be implemented, the vehicle control system 100 may determine whether the charging event would drain or charge the battery 120 and/or the fuel cell stack 124 (314). The vehicle control system 100 may determine that the charging event would drain or charge the battery 120 and/or the fuel cell stack 124 using the one or more sensors 128. For example, the vehicle control system 100 may use an incline sensor 128c to measure the grade or level of the incline of the road, and when the grade or level of the incline of the road is increasing, the vehicle control system 100 may determine that the charging event is an uphill event 410, which would require additional power, i.e., further drain the battery 120 and/or the fuel cell stack 124. Whereas, when the grade or level of the incline of the road is decreasing, the vehicle control system 100 may determine that the charging event is a downhill event 412, which would charge the vehicle 102.

In some implementations, the vehicle control system 100 may use the type or kind of charging event to determine whether the charging event would drain or charge the battery 120 and/or the fuel cell stack 124. The vehicle control system 100 may associate an uphill event, a marsh or wetlands event or other event with a charging event that requires additional power, which would drain the battery 120 and/or the fuel cell stack 124. Whereas, the vehicle control system 100 may associate a downhill event or other event with a charging event that generates power, which would charge the battery 120 and/or the fuel cell stack 124.

If the charging event is or near an uphill event 410 where the grade, incline or level of the ground increases, or other terrain feature, such as that of a marsh event 408, that would cause the vehicle 102 to require more power or energy to traverse, the vehicle control system 100 may determine that the charging event would require additional energy and drain the battery 120 and/or the fuel cell stack 124. When the vehicle control system 100 determines that the charging event would require additional energy to traverse the charging event, the vehicle control system 100 may pre-charge the battery 120 and/or the fuel cell stack 124 (316). Correspondingly, the vehicle control system 100 may need to further utilize the engine 122 to provide the additional power. The vehicle control system 100 may rely on another power source, such as the engine 122, to move or propel the wheels of the vehicle 102 while also pre-charging the battery 120 and/or the fuel cell stack 124. This allows the vehicle control system 100 to later rely on the battery 120 and/or the fuel cell stack 124 for the additional power to traverse the route at the charging event that requires the additional energy.

Otherwise, when the vehicle control system 100 determines that the charging event would allow the vehicle to recapture energy, the vehicle control system 100 may discharge electrical energy from the battery 120 and/or the fuel cell stack 124 to move or propel the wheels of the vehicle 102 to traverse the route 402 near or in proximity, such as within a threshold distance, of the charging event, which would allow the vehicle 102 to recapture energy later (318). This would decrease the use of and reliance on the other power source, such as the engine 122. For example, as the vehicle 102 approaches a downhill event 412, where the vehicle 102 could use regenerative braking to recapture energy, the vehicle control system 100 may use energy from the battery 120 and/or the fuel cell stack 124 to move or propel the wheels of the vehicle 102 in anticipation that once the vehicle 102 reaches the downhill event 412, the vehicle 102 may recapture energy while traveling downhill using regenerative braking.

In some implementations, the vehicle control system 100 may estimate the amount of energy that may be recaptured during or after the charging event. For example, the vehicle control system 100 may estimate the amount of energy that may be recaptured via regenerative braking during the downhill event 412. The vehicle control system 100 may obtain information regarding the charging event, such as the distance of the downhill event 412, from the map information within the navigational map information, and may estimate the amount of energy that may be recaptured at the charging event. The vehicle control system 100 may discharge the battery 120 and/or the fuel cell stack 124 prior to reaching the charging event based on the amount of energy that may be recaptured and/or a state of charge of the battery 120 and/or the fuel cell stack 124. The vehicle control system 100 uses the energy from the battery 120 and/or the fuel cell stack 124 to move the vehicle 102 prior to the location of the charging event so that the maximum amount of energy is recaptured when the vehicle 102 traverses the route 402 during the charging event, such as during the downhill event 412.

When the vehicle control system 100 determines that the long-term charging plan is to be implemented, such as when the vehicle 102 is approaching and/or within the threshold distance of the home event 404, the vehicle control system 100 may determine a next energy profile that will be initialized or used by the vehicle 102 on the next route traversal (320). The vehicle control system 100 may obtain the next energy profile from the memory 110. The vehicle control system 100 may determine the next energy profile based on the time and/or day when the vehicle 102 is anticipated or predicted to be next initialized and/or used. The vehicle control system 100 may determine a frequency of usage of the vehicle 102 and/or the amount of time in between usages of the vehicle 102. The vehicle control system 100 may predict when the vehicle 102 is to be next initialized and/or used based on the frequency and/or the amount of time in between usages. For example, if the vehicle 102 is initialized every other day, then the vehicle control system 100 may predict that the vehicle 102 will be next initialized in a couple of days.

In some implementations, the vehicle control system 100 may reference a calendar, a schedule or a learned behavior, such as a pattern of operation based on a history of initializations, to anticipate when the vehicle 102 is to be next initialized and/or used. For example, if the vehicle 102 is initialized every Monday, Wednesday, and Friday, the vehicle control system 100 may predict that the vehicle 102 is to be next initialized and/or used the next Monday, Wednesday and/or Friday. In another example, the vehicle control system 100 may download a calendar that has information containing a schedule for when the vehicle 102 is to be initialized and predict that the vehicle is to be next initialized and/or used based on the calendar.

In some implementations, the next energy profile may be based on a crop that the vehicle 102 intends to harvest or plant. For example, the vehicle control system 100 may predict that a crop, such as wheat, is to be harvested or planted next, based on the time, day, or year, or based on the harvesting or planting of other previous crops, such as the harvesting of soybean, and determine that the next energy profile to be initialized and/or used should be the energy profile associated with the harvesting of wheat. Once the next energy profile is determined, the vehicle control system 100 may obtain the next energy profile from the memory 110.

The vehicle control system 100 may charge, discharge or otherwise control the energy within the battery 120 and/or the fuel cell stack 124 based on the next energy profile (322). The next energy profile may indicate that an attachment, such as a trailer, will be added to the vehicle 102 when the vehicle 102 is next initialized and/or used. The vehicle control system 100 adjusts the charging and/or discharging of the energy along the remainder of the route when the vehicle 102 is approaching the charging event based on the next energy profile that is to be used during the next use. For example, if the energy profile indicates that an attachment will be used on during the next use, the vehicle control system 100 may conserve the charge within the battery 120 and/or the fuel cell stack 124 along the remainder of the route toward the charging event on the current route. This conserves the energy so that the vehicle control system 100 may use the energy to startup and initially move the vehicle 102 with the attachment. In another example, the next energy profile may indicate that there is no attachment, that the vehicle 102 is not to be used or initialized for a prolonged period, and/or that the vehicle 102 is to travel downhill soon thereafter. Thus, the vehicle control system 100 may discharge the battery 120 and/or the fuel cell stack 124 along the remainder of the route toward the charging event on the current route. Since the vehicle 102 does not require additional or as much energy to startup and/or initially move, the charge may be utilized to move the wheels of the vehicle 102 on the current route, instead of for starting up and/or decaying while waiting for the next initialization or use.

Figure 5:
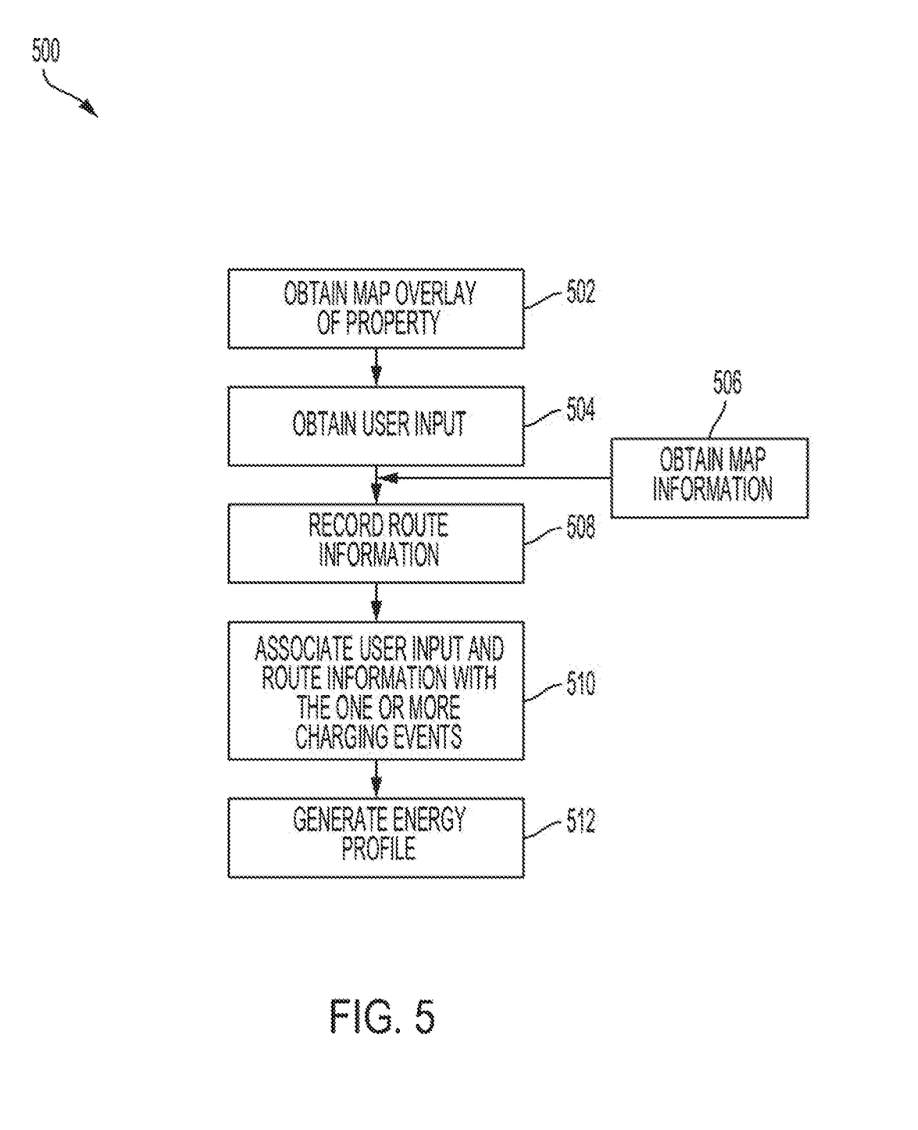
FIG. 5 is a flow diagram of an example process for generating an energy profile using the vehicle control system of FIG. 1 according to an aspect of the invention.

FIG. 5 is a flow diagram of a process 500 for generating an energy profile to be used to traverse one or more routes. One or more computers or one or more data processing apparatuses, for example, the ECU 108 of the vehicle control system 100 of FIG. 1, appropriately programmed, may implement the process 500. The energy profile may be used to determine when the vehicle control system 100 implements the short-term, medium-term or long-term energy plan while traversing one or more routes within a property.

The vehicle control system 100 may obtain a map overlay of the property that is to be traversed (502). The map overlay may be part of the map information that is obtained from navigational map information. The map overlay may indicate the boundaries of the property from which the vehicle 102 may traverse within. The vehicle control system 100 may obtain the map overlay from the external database 104.

The vehicle control system 100 may obtain user input (504). The user input may indicate locations and the type or kind of one or more charging events within the boundaries of the property. The user input may also indicate associations of the one or more charging events with one or more charging plans, such as a short-term, a medium-term and/or a long-term charging plan, and/or an identifier of the type or kind of charging event. The user input may also indicate one or more attachments to the vehicle, the date/time, the schedule, the type or kind of vehicle that is to be used, the route to be traversed along the property and/or other information that is to be associated with the energy profile.

The vehicle control system 100 may obtain map information (506). The map information may be extracted from the navigational map information and/or may be obtained from the external database 104 and/or using the navigation unit 116. The map information may indicate the locations and/or the types or kinds of the one or more charging events. The one or more charging events may be associated with one or more charging plans, which may form the basis of the energy profile for the route.

The vehicle control system 100 may also record route information while also traversing the route (508). The route information may include the route that the vehicle 102 traverses along with information regarding the energy usage along the route, such as whether the vehicle 102 requires additional energy, whether the vehicle 102 is traveling uphill or downhill and/or whether the vehicle 102 is recapturing energy, along various portions of the route. The vehicle control system 100 may use a battery sensor 128e to detect when energy is being discharged from the battery 120 and/or the battery 120 is being charged, for example. In another example, an incline sensor 128c may detect when there is an increasing slope or a decreasing slope, which may indicate when there is an uphill event or a downhill event, respectively. In another example, the vehicle control system 100 may use an attachment sensor 128d to determine that at the location of the home event an attachment device has been attached to the vehicle 102. The route information may also identify one or more charging events. For example, a vehicle speed sensor 128b may be used to detect when the vehicle 102 is slowing to a stop or to turn or a camera 128a may be used to detect another stopping event, such as a maintenance shed or a silo, or a home event, such as a barn. This route information may be stored in the memory 110 so that there is a baseline of the energy usage along the route.

For each of the one or more charging events, the vehicle control system 100 associates information from the user input and the route information with the one or more charging events (510). The vehicle control system 100 may map the energy usage along the route with the one or more charging events. For example, the vehicle control system 100 may associate the need for additional energy with an uphill event based on the recorded energy usage obtained in the route information at the location of the uphill event. In another example, the vehicle control system 100 may associate the medium-term charging plan to the location of the uphill event or the downhill event based on user input that associates the medium-term charging plan with the uphill event or the downhill event. Similarly, the home event may be associated with the long-term charging plan via user input or that an attachment device is attached to the vehicle 102 at the home event based on user input or detection of the attachment device in the route information.

The vehicle control system 100 generates the energy profile (512). The vehicle control system 100 generates the energy profile based on the one or more charging events and the associations with the one or more charging events including the energy usage along the portion of the route at or near, such as within a threshold distance, of the one or more charging events, the charging plan for each of the one or more charging events and/or an identifier of the type or the kind of the one or more charging events. The energy profile may indicate the charging plan to be used at or near the one or more charging events. The energy profile may be a baseline energy profile, which may be supplemented by and/or updated, while the vehicle 102 traverses the route by the detection of real-time charging events and/or sensor data.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle control system for a vehicle, comprising:
   a memory configured to store a plurality of charging events that activate a plurality of charging plans, the plurality of charging events including a first charging event that activates a first charging plan of the plurality of charging plans, a second charging event that activates a second charging plan of the plurality of charging plans, and a third charging event that activates a third charging plan of the plurality of charging plans, wherein the first charging event is a stopping event and the first charging plan is a short-term charging plan, the second charging event is an uphill event or a downhill event and the second charging plan is a medium-term charging plan, and the third charging event is a home event and the third charging plan is a long-term charging plan;
a navigation unit configured to obtain a current location of the vehicle; and
an electronic control unit coupled to the navigation unit and configured to:
determine that the vehicle is within a threshold distance of the first charging event, and
control an operation of the vehicle to prepare the vehicle to charge or discharge a battery based on the first charging plan when the vehicle is within the threshold distance of the first charging event.

2. The vehicle control system of claim 1, wherein the first charging event is a stopping event, wherein the electronic control unit is configured to:
determine a regenerative braking location based on a location of the stopping event;
determine a coasting location based on the regenerative braking location;
wherein to control the operation of the vehicle the electronic control unit is configured to:
indicate to a driver to release an accelerator pedal of the vehicle at the coasting location to capture energy while coasting.

3. The vehicle control system of claim 2, wherein the electronic control unit is configured to:
determine an amount of regenerative energy capacity; and
determine the regenerative braking location further based on the amount of regenerative energy capacity.

4. The vehicle control system of claim 2, wherein the electronic control unit is configured to:
determine a coasting deceleration drive rate that affects deceleration of the vehicle while coasting; and
determine the coasting location further based on the coasting deceleration drive rate.

5. The vehicle control system of claim 1, wherein the first charging event is an uphill event or a downhill event, wherein the electronic control unit is configured to:
discharge a battery to move the vehicle when the vehicle is within the threshold distance of the downhill event; and
charge the battery when the vehicle is within the threshold distance of the uphill event.

6. The vehicle control system of claim 1, wherein the first charging event is a home event, wherein the electronic control unit is configured to:
determine a profile to be implemented during a next trip; and
charge or discharge a battery of the vehicle based on the profile to be implemented during the next trip.

7. The vehicle control system of claim 6, wherein to charge or discharge the battery of the vehicle based on the profile to be implemented the electronic control unit is configured to:
charge the battery of the vehicle while the vehicle is traveling to a location of the home event when the profile indicates that a trailer is to be attached during the next trip.

8. A vehicle control system for a vehicle, comprising:
a navigation unit configured to obtain a current location of the vehicle and a plurality of charging events; and
an electronic control unit coupled to the navigation unit and configured to:
determine that the vehicle is within a threshold distance of a charging event of the plurality of charging events, the charging event being a stopping event,
determining whether the charging event is associated with a first short-term charging plan, a second medium-term charging plan or a third long-term charging plan,
control an operation of the vehicle to prepare the vehicle to charge or discharge a battery based on the first charging plan, the second charging plan or the third charging plan when the vehicle is within the threshold distance of the charging event;
determine a regenerative braking location based on a location of the stopping event;
determine a coasting location based on the regenerative braking location; and
indicate to a driver to release an accelerator pedal of the vehicle at the coasting location to capture energy while coasting.

9. The vehicle control system of claim 8, wherein the charging event is a stopping event that is associated with the short-term charging plan, an uphill event or a downhill event that is associated with the medium-term charging plan, or a home event that is associated with the long-term charging plan.

10. The vehicle control system of claim 8, wherein the electronic control unit is configured to:
determine an amount of regenerative energy capacity; and
determine the regenerative braking location further based on the amount of regenerative energy capacity.

11. The vehicle control system of claim 8, wherein the electronic control unit is configured to:
determine a coasting deceleration drive rate that affects deceleration of the vehicle while coasting; and
determine the coasting location further based on the coasting deceleration drive rate.

12. The vehicle control system of claim 8, wherein the charging event is an uphill event or a downhill event, wherein the electronic control unit is configured to:
discharge a battery to move the vehicle when the vehicle is within the threshold distance of the downhill event; and
charge the battery when the vehicle is within the threshold distance of the uphill event.

13. The vehicle control system of claim 8, wherein the charging event is a home event, wherein the electronic control unit is configured to:
determine a profile be implemented during a subsequent trip; and
charge or discharge a battery of the vehicle based on the profile to be implemented during the subsequent trip.

14. The vehicle control system of claim 13, wherein to charge or discharge the battery of the vehicle based on the profile to be implemented the electronic control unit is configured to:
charge the battery of the vehicle while the vehicle is traveling to a location of the home event when the profile indicates that a trailer is to be attached during the subsequent trip.

15. A method of charging a vehicle, comprising:
obtaining or determining, by a processor, a plurality of locations of charging events including a first location of a first charging event, the first charging event being associated with a first charging plan;
obtaining, by the processor, a current location of the vehicle;

determining, by the processor, that the vehicle is within a threshold distance of the first charging event based on the current location of the vehicle and the first location of the first charging event; and controlling, by the processor, an operation of the vehicle to prepare the vehicle to charge or discharge a battery based on the first charging plan when the vehicle is within the threshold distance of the first location of the first charging event, wherein controlling the operation of the vehicle includes:

discharging a battery to move the vehicle when the vehicle is within the threshold distance of the first charging event when the first charging event is a downhill event; and charging the battery when the vehicle is within the threshold distance of the first charging event when the first charging event is an uphill event.

16. The method of claim 15, wherein the first charging event is a stopping event.

17. The method of claim 16, further comprising:

determining a regenerative braking location based on the first location;

determine a coasting location based on the regenerative braking location; and indicating to a driver to release an accelerator pedal of the vehicle at the coasting location to capture energy while coasting.

* * * * *